United States Patent [19]

Kobayashi et al.

[11] Patent Number: 5,106,284
[45] Date of Patent: Apr. 21, 1992

[54] THREE-LAYERED CONTAINER, A METHOD AND APPARATUS THEREOF

[75] Inventors: Hidenori Kobayashi; Moriaki Suwabe; Nobuhiro Inakazu; Hatsuo Nagamatsu, all of Tokyo, Japan

[73] Assignee: Kamaya Kagaku Kogyo Co., Ltd., Tokyo, Japan

[21] Appl. No.: 702,370

[22] Filed: May 15, 1991

Related U.S. Application Data

[60] Continuation of Ser. No. 516,040, Apr. 27, 1990, abandoned, which is a division of Ser. No. 298,122, Jan. 17, 1989, Pat. No. 4,957,682.

[30] Foreign Application Priority Data

Jan. 19, 1988 [JP] Japan .................................. 63-9209
Apr. 1, 1988 [JP] Japan .................................. 63-80448
Jun. 2, 1988 [JP] Japan .................................. 63-136547

[51] Int. Cl.⁵ .............................................. B29C 45/16
[52] U.S. Cl. .................................. 425/130; 425/133.1; 425/382.4; 425/533; 425/573
[58] Field of Search .................... 425/130, 131.1, 132, 425/133.1, 570, 573, 113, 114, 380, 382.4, 533; 264/513, 245, 255

[56] References Cited

U.S. PATENT DOCUMENTS

| | | | |
|---|---|---|---|
| 3,109,198 | 11/1963 | Guignard | 425/DIG. 224 |
| 3,894,823 | 7/1975 | Hanning | 425/130 |
| 3,921,856 | 11/1975 | Langecker | 425/133.1 |
| 3,947,113 | 3/1976 | Dougherty | 425/113 |
| 3,947,177 | 3/1976 | Eckardt | 425/DIG. 224 |
| 4,281,981 | 8/1981 | Feldman | 425/382.4 |
| 4,459,257 | 7/1984 | Baciu | 264/255 |
| 4,522,775 | 6/1985 | Briggs et al. | 425/133.1 |
| 4,548,569 | 10/1985 | Pitigliano et al. | 425/133.1 |
| 4,578,024 | 3/1986 | Sicka et al. | 425/114 |
| 4,657,718 | 4/1987 | Sicka et al. | 425/380 |
| 4,774,047 | 9/1988 | Nakamura et al. | 264/513 |
| 4,895,504 | 1/1990 | Kudert et al. | 425/133.1 |
| 4,961,892 | 10/1990 | Prevotat | 425/380 |

FOREIGN PATENT DOCUMENTS

| | | |
|---|---|---|
| 0170594 | 2/1986 | European Pat. Off. . |
| 0199633 | 10/1986 | European Pat. Off. . |
| 0246512 | 11/1987 | European Pat. Off. . |
| 0302117 | 2/1989 | European Pat. Off. . |
| 3519921 | 12/1985 | Fed. Rep. of Germany . |
| 237279 | 7/1986 | Fed. Rep. of Germany . |
| 1210419 | 3/1960 | France ............................. 425/113 |
| 59-67029 | 4/1984 | Japan . |
| 61-37404 | 2/1986 | Japan . |

Primary Examiner—Jay H. Woo
Assistant Examiner—Robert B. Davis
Attorney, Agent, or Firm—Hoffman & Baron

[57] ABSTRACT

A method for manufacturing a three-layered container by injection molding, the method consecutively including steps of:

(a) preparing an injection molding apparatus having:
an inner injector element having a tubular inner body and a flow path communicating with the inner inlet nozzle and an inner injecting nozzle formed both ends of the body, respectively; and
an outer injector element having a tubular outer body including an outer injection nozzle and an outer inlet nozzle, the outer injector element disposed to hold the inner injector element so that a tubular space is formed between the inner and the outer bodies, the inlet nozzle of the outer body communicating with a curved groove formed in the outer surface of the inner injector body; and
the inner surface of the outer body and the outer surface of the inner body are in a form so that the thickness of the tubular space therebetween is smaller at a portion compared to other portions;

(b) injecting a first resin from the outer injection nozzle;

(c) injecting a second resin from the inner injection nozzle 0.0001-3.0 seconds after the end of the preceding step of injecting the first resin; and (d) injecting the first resin from the outer injection nozzle, 0.0001-1.0 second after the start of the precedent injecting the second resin.

7 Claims, 4 Drawing Sheets

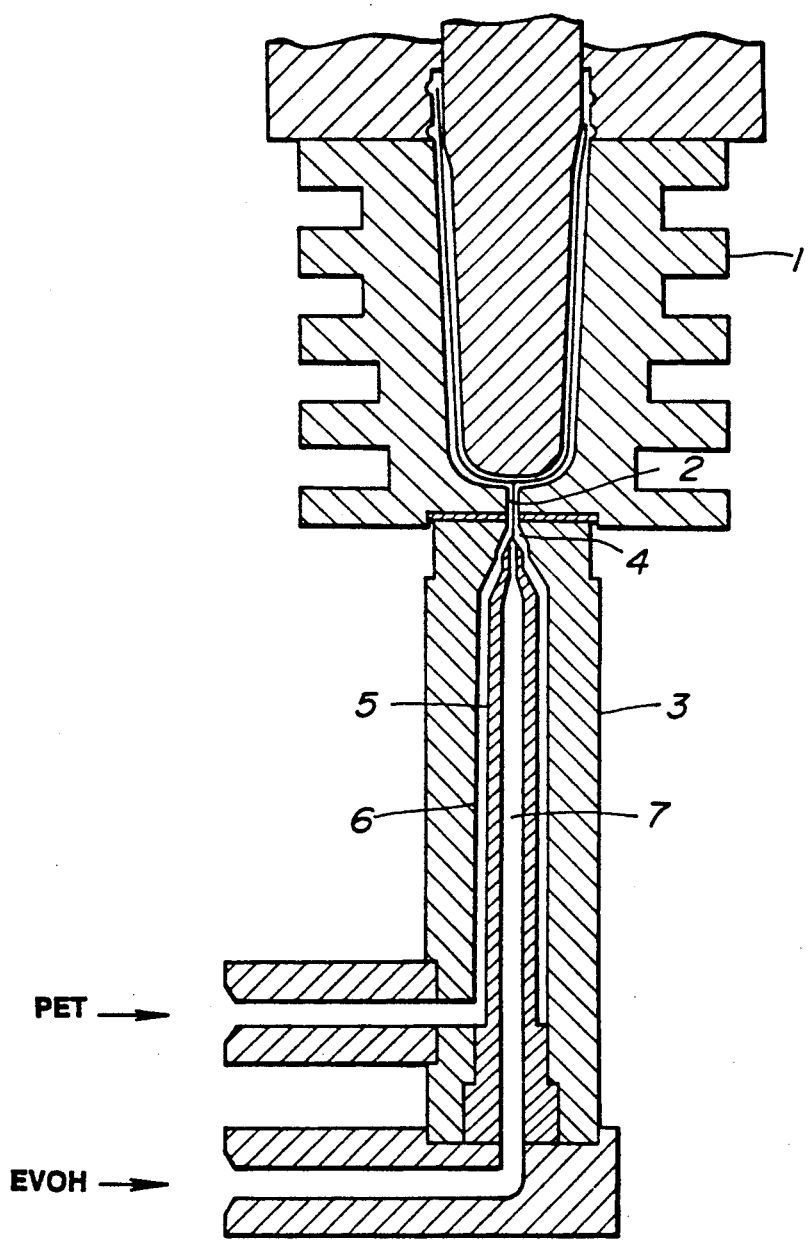

THREE-LAYERED CONTAINER, A METHOD AND APPARATUS THEREOF

CROSS REFERENCE TO RELATED APPLICATIONS

This is a continuation application of co-pending application Ser. No. 07/516,040 filed on Apr. 27, 1990 now abandoned which was a divisional application of application Ser. No. 07/298,122 filed on Jan. 17, 1989, now U.S. Pat. No. 4,957,682, issued on Sep. 18, 1990.

BACKGROUND OF THE INVENTION

1. Field of the invention

The present invention relates to injection molding of three-layered containers for dry foods and other food such as instant coffee and powdered cream which require vapor-proof containers of very low gas permeability, a method, and an apparatus thereof by means of injection molding.

2. Prior Art

Although plastic containers are widely used for food, medicine, cosmetics, etc., it has been necessary to improve the gas-barrier properties of plastic containers when they are used as containers for dry foods and other foods, such as instant coffee and powdered cream, which tend to deteriorate in the presence of oxygen and water vapor.

Highly protective multilayered containers prepared by laminating gas barrier resin layers such as ethylene-vinyl alcohol copolymers can be cited as plastic containers having highly protective gas-barrier properties. A multilayer injection molding apparatus disclosed in Japanese Patent Application First Publication "kokai" No. 59-67029 can be cited as an example of an apparatus for molding parisons for such multilayered containers, and injection molding of multilayered bottomed parisons disclosed in Japanese Patent Application First Publication "kokai" No. 61-37404 can be mentioned as an example of a method for molding parisons described above.

In the multilayer injection molding apparatus described above, a nozzle is inserted inside an outer nozzle to give a resin path both inside and outside the inserted nozzle, and each of the resins introduced through these paths are injected from the gate of the outer nozzle.

Such an injection molding apparatus has the general structure shown in FIG. 7. An outer injection nozzle 4 of an outer injector element 3, which injects resin into a metal mold 1 of the machine, is connected to an orifice 2 formed at the bottom of the metal mold 1; and an inner injector element 5 is inserted in the outer injector element 3 to form resin flow paths 6 and 7 on the outside and inside, respectively, of the inner injector element 5. For example, polyethylene terephthalate type resin and ethylene vinyl alcohol copolymer are injected into the metal mold 1 from the outer injection nozzle 4 by simultaneously introducing the former resin into the outer injection nozzle 4 through the resin flow path 6 and the latter resin into the outer injection nozzle 4 through the resin flow path 7.

The injection molding described above of the multilayered parisons can be carried out to produce 5- or 4-layered bottomed parisons by using a triple nozzle having three concentric flow paths inside the nozzle body mouth, forming an inner and an outer layer with resins flowing out from the outer flow paths, and forming middle layers with resins flowing out from the two internal flow paths.

In the conventional injection molding described above, two or more kinds of resin are simultaneously injected simply by placing another resin flow path on the outside of an inner resin flow path. The obtained parisons show, therefore, uneven thickness of each layer and varied height of the middle layers in the circumferential direction, thus the formation of necessary middle layers is difficult. Multilayered containers with high gas-barrier properties cannot be mass-produced due to the impossibility of continually forming container walls with high gas-barrier properties when such an injection molding method is employed, and the multilayered containers so produced do not have an attractive appearance.

The resin for the outer wall of the containers is usually supplied from the side of the nozzle body, and the resin feed to the side opposite to the resin supply-side becomes insufficient due to the flow path length difference between the resin supply-side flow and the opposite-side flow. In addition to this, injection conditions cannot be held constant due to indefinite setting of fluidity of the resin forming each layer, and therefore manufacture of many products having a uniformly high quality has been extremely difficult.

Furthermore, the ethylene-vinyl alcohol copolymer employed for the middle layer of the multilayered containers tends to be thermally decomposed easily, and therefore may suffer thermal damage in the resin flow path during injection molding. Moreover, the flow temperature of ethylene-vinyl alcohol copolymer must be 50°-60° C. lower than that of the polyethylene terephthalate type resin used for the inner and outer layers. Ethylene-vinyl alcohol copolymer may deteriorate from heat conducted from the polyethylene terephthalate when many parisons are simultaneously produced by injection in a molding apparatus having branched and closely spaced resin supply paths. The continuous mass production of the multilayered containers having desired properties and quality therefore becomes difficult, and considerable variation in quality is observed among simultaneously injected parisons. The quality of parisons also shows wide variation among sets.

SUMMARY OF THE INVENTION

The present invention has been achieved by considering the various problems described above. An object of this invention is to provide a three-layered container, a method, and an apparatus thereof by means of injection molding, the method comprising the steps of:

(a) preparing an injection molding apparatus having:

an inner injector element having a tubular inner body including an inner injection nozzle at an end, an inner inlet nozzle near the other end and a flow path communicating with the inner inlet nozzle and the inner injection nozzle, and a curved groove formed in an outer surface of the body; and an outer injector element having a tubular outer body including an outer injection nozzle at one end, an outer inlet nozzle near the other end, the outer injector element being disposed to hold the other end of the inner injector element so that a tubular space is formed between the inner and the outer injector bodies, the inlet nozzle of the outer injector body communicating with the curved groove formed in the outer surface of the inner injector body;

wherein an inner surface of the outer injector body and an outer surface of the inner injector body are in a form so that the thickness of the tubular space therebetween is smaller at a portion compared to other portions, (b) consecutively injecting a first resin from the outer injection nozzle;

(c) consecutively injecting a second resin from the inner injection nozzle between 0.0001 and 3.0 seconds after the end of the preceding step of injecting the first resin; and (d) consecutively injecting the first resin from the outer injection nozzle between 0.0001 and 1.0 second after the start of the previous injecting the second resin, wherein the first resin is a polymer containing, as main components, glycol and aromatic dicarboxylic acid which is selected from the group consisting of polyethylene terephtalate and polybutylene terephtalate, the first resin having an intrinsic viscosity between 0.65 and 0.82, the second resin ethylene-vinyl alcohol copolymer having an ethylene copolymerization ratio between 32 and 60 mol %, saponification degree of the vinyl acetate component not less than 90 mol %, and melt index between 5.8 and 18.

BRIEF DESCRIPTION OF THE DRAWINGS

FIG. 7 is the outline of a sectional view showing the conventional injection molding machine apparatus according to the prior art.

DETAILED DESCRIPTION OF THE INVENTION

An example of this invention is illustrated below.

Figure 2:
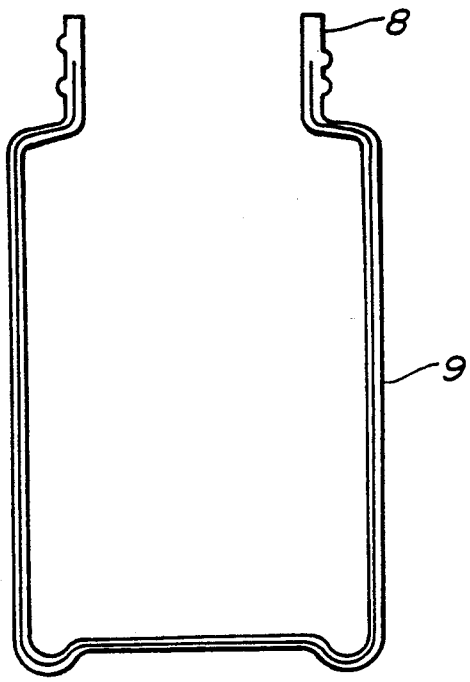
FIG. 2 is a longitudinal sectional view of the three-layered container of this invention.
Figure 3:
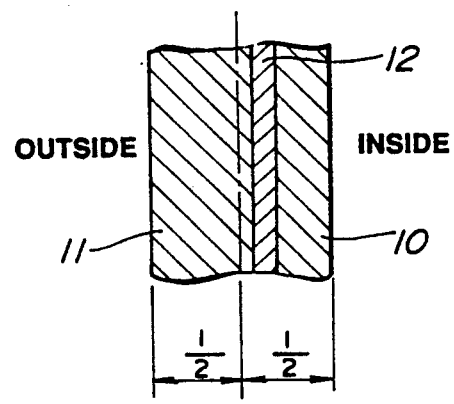
FIG. 3 is a sectional view of a body of the three-layered container of this invention.

As shown in FIG. 2 and FIG. 3, the three-layered containers of this example consist of a mouth 8 and a body 9 having a diameter larger than the mouth 8, and the sectional structure of the containers has a triple layering consisting of an inner layer 10, a middle layer 12, and an outer layer 11. In the body 9 having a total average thickness of 0.25-1.2 mm, the middle layer 12 has an average thickness of 0.01-0.2 mm, and the outer layer 11 has a thickness more than half of the total thickness of the layers.

In the three-layered containers, the inner layer 10 and the outer layer 11 are composed of polyethylene terephthalate. The polyethylene terephthalate has an intrinsic viscosity between 0.65 and 0.82, shows fluidity sufficient for smoothly passing through the resin flow path during injection molding to form the desired thickness easily when injected. The middle layer 12 is composed of ethylene-vinyl alcohol copolymer having an ethylene copolymerization ratio between 32 and 60 mol % and a saponification degree of the vinyl acetate component over 90 mol %. The ethylene-vinyl alcohol copolymer shows lower moldability when the copolymerization ratio is below 32 mol %, and insufficient gas-barrier properties when the copolymerization ratio exceeds 60 mol %. The vinyl acetate copolymer also shows insufficient gas-barrier properties when the degree of saponification is below 90 mol %. The ethylene-vinyl alcohol used in the example has a melt index of 5.5-18 g/10 min. The melt index is the number of grams of ethylene-vinyl alcohol copolymer at 190° C. that can be forced through a 2.095 mm diameter orifice with an 8.0 mm length in 10 minutes by a 2160 g force. The melt index range has been selected due to the following reasons: ethylene-vinyl alcohol copolymer shows fluidity insufficient for smoothly passing through the resin flow path during injection molding when the melt index is below 5.5 g/10 min., and difficulty in forming the desired thickness after injection when the melt index exceeds 18 g/10 min.

Raw materials for synthesizing ethylene-vinyl alcohol copolymer used in this example may contain, in addition to ethylene and vinyl alcohol, a small amount of other copolymer components, e.g., olefin such as propylene, isobutylene, and higher α-olefin, unsaturated carboxylic acid such as acrylic acid, methacrylic acid, crotonic acid, and maleic acid, and alkyl ester of the unsaturated acid.

Polymers such as polybutylene terephthalate formed mainly from aromatic dicarboxylic acid and glycol may also be used for the inner layer 10 and outer layer 11.

An ultraviolet absorber is added to the inner layer 10 and outer layer 11. The following compounds may be mentioned as ultraviolet absorbers: benzotriazole type organic compounds such as 2-(2′-hydroxy-5′-methylphenyl)benzotriazole,2-(2′-hydroxy-5′-tert-octylphenyl)benzotriazole. 2-(3′,5′-di-tert-butyl-2′-hydroxyphenyl)benzotriazole, 2-(2′-hydroxy-3′,5′-di-tert-pentylphenyl)benzotriazole, 2-[3′,5′-bis(α, αdimethylbenzyl)-2′-hydroxyphenyl]-2H-benzotriazole, 2-(3′-tert-butyl-2′-hydroxy-5′-methylphenyl)-5-chlorobenzotriazole, and 2-(3′,5′-di-tert-butyl-2′-hydroxyphenyl)-5-chlorobenzotriazole; oxanilide type organic compounds such as 2-ethoxy-2′-ethyloxanilide, and 2-ethoxy-5-tert-butyl-2′-ethyloxanilide; benzophenone type organic compounds such as 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2′-dihydroxy-4,4-dimethoxybenzophenone, 2,2′,4,4′-tetrahydroxybenzophenone, 2-hydroxy-4-methoxybenzophenone-5-sulfonic acid, and sodium 2,2′-dihydroxy 4,4′-dimethoxybenzophenone-5-sulfonate; ester type organic compounds such as phenyl-2-hydroxybenzoate, 4-tert-butylphenyl-2-hydroxybenzoate, 2,4-di-tert-butylphenyl-3′,5′-di-tert-butyl-4′-hydroxybenzoate. ethyl-2-cyano-3,3-diphenylacrylate, and 2-ethylhexyl-2-cyano-3,3-diphenylacrylate; and organometallic compounds such as [2,2′-thiobis(4-tert-octylphenolate)]-2-ethylhexylamine-Ni (II).

Although an ultraviolet light absorbent was added in the inner layer 10 and outer layer 11 in this example, the addition is not always necessary. The absorbent may be added to the inner layer 10, middle layer 12, and outer layer 11, as desired.

Figure 1:
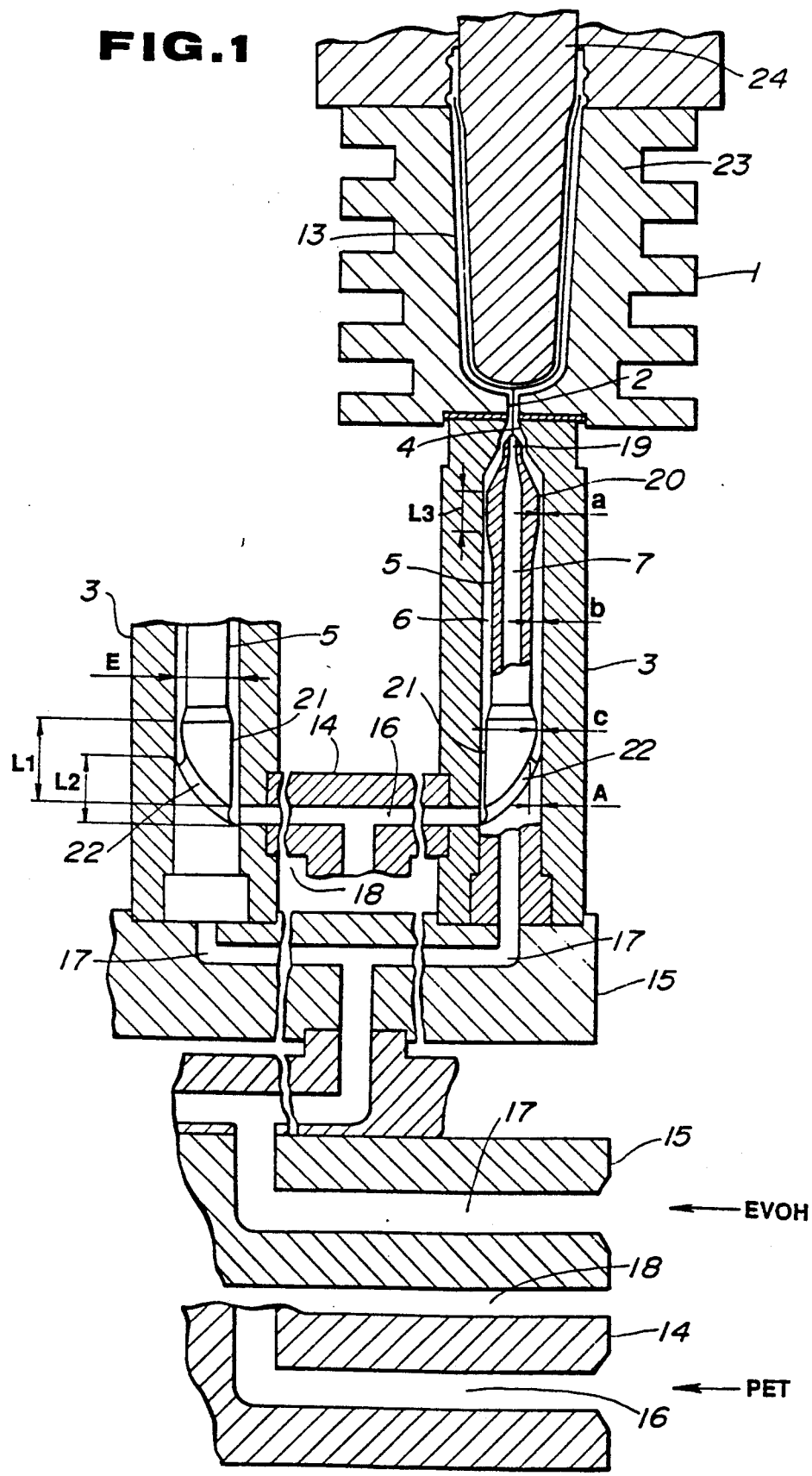
FIG. 1 is a sectional view of the injection molding apparatus of this invention.

In order to manufacture such three-layered containers, at first, multilayered parisons 13 are molded by using an injection molding apparatus shown in FIG. 1.

The injection molding apparatus has a first-flow path block 14 connected to an injection cylinder (not illustrated) which injects polyethylene terephthalate, and a second flow path block 15 connected to an injection cylinder (not illustrated) which injects ethylene-vinyl alcohol copolymer. A first resin feed path 16 which branches at two levels into a plurality of branches formed in the first flow path block 14, and each branched path is attached to an outer injector element 3. A second resin feed path 17 which branches at two levels into a plurality of branches is formed in the second flow path block 15, and each branched path is attached to an inner injector element 5. The branched paths of the first resin feed path 16 each has the same length on the down flow side from the branched point, and the branched paths of the second resin feed path 17 also have the same length. After branching each feed has a diameter from 1/5-1/1 of that of the feed path before branching. A gap 18 is formed between the first flow path block 14 and the second flow path block 15, and a heat insulating layer of air or heat insulating material is placed in the gap 18.

The outer injection element 3 is formed cylindrically. An outer injection nozzle 4 which injects resin is formed at the front end of the outer injection element 3, and the first resin flow feed path 16 is attached to the side of the rear end of the outer injector element 3. A cylindrical inner injector element 5 is inserted inside the outer injection element 3, and the rear end of the inner injector element 5 is fitted to the rear end of the outer injection element 3 to close the outer injection element rear end. The inner injection element 5 is formed cylindrically, and an inner injection nozzle 19 to be placed inside the outer injection nozzle 4 is formed at the front end of the inner injector element 5. Expanders 20, 21 are formed on the side of the front end and rear end of the inner injector element 5, respectively. A first resin flow path 6 surrounded by the inner surface of the outer injector element 3 is formed outside the inner injector element 5, and a second resin flow path 7 is formed inside the inner injector element 5. The first resin feed path 16 leading into the first resin flow path 6 is attached to the side of the rear end of the outer injector element 3. The second resin flow path 17 is attached to the rear end of the inner injector element 5. The expanders 20, 21 have length $L_3$ and $L_1$, respectively, and are so designed that $L_3$ and $L_1$ are both in the range 0.5E-3.5E (E=inside diameter of the outer injector element 3). The width "a" of the resin flow path 6 at the expander 20, and the width "c" of that at the expander 21 are so designed that "a" and "c" are both in the range between 0.3b and 0.8b ("b"=width of the first resin flow path 6 excluding the path on the side of the expanders 20, 21). A curved groove 22 extending upward with a curve is formed along the external circumference of the expander 21 at the rear end of the inner injection element 5 from the attached side of the first resin feed path 16, and therefore the flow path difference between resin flowing on the attached side of the first resin feed path 16 and resin flowing on the opposite side is diminished. The curved groove 22 is so designed that its length $L_2$ is over 0.8E (E as described above), and that the depth "A" of the curved groove 22 is in the range 0.5b-2b ("b" as described above).

Although the injection molding apparatus is adjusted to inject a circumferentially uniform resin flow by designing the ratio of the length $L_1$ of the expander 21 to the length $L_2$ of the curved groove 22, the outside diameter of the expanders 20, 21, and other dimensions of the apparatus, the injection of the uniform resin flow may also be obtained by essentially displacing the expanders 20, 21 to the attached side of the resin feed path 16 to narrow the first resin flow path 6 on the attached side of the first resin feed path 16 compared with the first resin flow path 6 opposite to the attached side.

Figure 4:
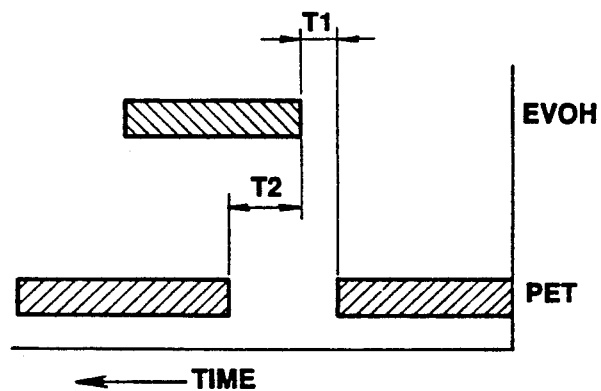
FIG. 4 and FIG. 5 are graphs showing the injection timing of PET and EVOH.
Figure 5:
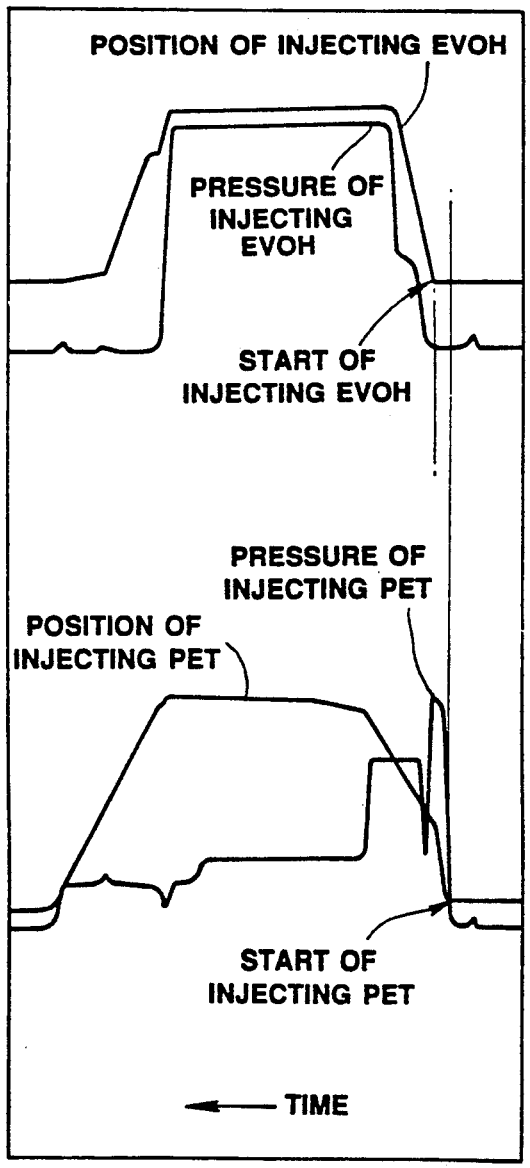

In order to injection mold the multilayered parisons 13 by using such an injection molding machine, a metal mold 1 is assembled by placing a core mold 24 in a cavity mold 23, and connecting an orifice 2 formed at the bottom of the cavity mold 23 to the outer injection nozzle 4 of the outer injector element 3. An ultraviolet light absorbent is added to the polyethylene terephthalate which is to form the inner layer 10 and outer layer 11 of the multilayered parisons 13. The injection of resins is carried out in the following steps, the time chart of which is shown in FIG. 4: (1) polyethylene terephthalate introduced through the first resin flow path 6 is injected from the outer injection nozzle 4; (2) the injection is immediately stopped; (3) ethylene-vinyl alcohol copolymer introduced through the second resin flow path 7 is injected from an inner injection nozzle 19 of the inner injector element 5 arranged inside the outer injection nozzle 4 after the elapse of the interval $T_1$ from the time of the injection stopping of the polyethylene terephthalate is injected again after the elapse of the interval $T_2$ from the time the injection of the ethylene-vinyl alcohol copolymer began, while the injection of the copolymer is continued. Parisons having a three-layered structure consisting of an middle ethylene-vinyl alcohol copolymer layer and a polyethylene terephthalate layer covering both sides and the front edge of the copolymer layer are injected by the above procedure, and fill the metal mold 1 in a cylindrical shape to form simultaneously the inner and outer layers 10, 11 composed of polyethylene terephthalate, and the middle layer 12 composed of ethylene-vinyl alcohol copolymer and to mold multilayered parisons. The multilayered parisons 13 are molded by controlling the injection order and the quantity of each resin with an automatically controlled hydraulic machine for driving an injection cylinder, or by other devices.

Multilayered parisons 13 are thus molded, thermally controlled, placed in a blow molding machine (not illustrated), and stretch-blown at a predetermined ratio to give desired three-layered containers.

Although the stopping time $T_1$ and injection time difference $T_2$ are preset in accordance with the size of the three-layered containers to be manufactured and thickness of each layer, it is preferable to set the stopping time $T_1$ for 0.0001-3.0 second and injection time difference $T_2$ for 0.0001-1.0 second as general injection timing applicable to parisons with various size, weight, and thickness. The following improved effects can be obtained by injection molding with the injection timing described above:

(1) a middle layer having desired thickness and length can be formed;

(2) the thickness of the middle layer can be set uniformly in the longitudinal and circumferential directions, and the dispersion of the middle layer thickness distribution can be decreased;

(3) when polyethylene terephthalate and ethylene-vinyl alcohol copolymer are injected generally simultaneously, good molded bodies can be obtained due to a decrease in white turbidity formation at the outer injection nozzle;

(4) parisons having good adhesion between the middle layer, and inner and outer layers can be obtained;

(5) the middle layer can be stably formed at a suitable location.

In order to inject parisons, which are to be molded into containers for instant coffee, etc., having respective weight 20-80 g and thickness 1.0-5.0 mm, it is preferable to set the stopping time $T_1$ for 0.05-1.0 second and the injection time difference for 0.05-0.5 second. In order to form a middle layer having more appropriate thickness and length with decreased dispersion from the desired values during the injection molding of the parisons described above, it is preferable to set the stopping time $T_1$ for 0.1-0.7 second and the injection time difference $T_2$ for 0.075-0.3 second.

Parisons each having a weight of 30 g and a thickness of 3.0 mm were molded under the following two injection conditions, I and II, and the dispersion of the middle layers of the respective 100 molded parisons for each condition were measured and compared: stopping time $T_1 = 0.05-1.0$ second, injection time difference $T_2 = 0.05-0.5$ second (condition I); stopping time $T_1 = 0.1-0.7$ second, injection difference time $T_2 = 0.075-0.3$ second (condition II). In this experiment, the desired value of the middle layer thickness (t) was set at 100-250 μm, and that of the ratio (1) of the middle layer length to the entire length was set at 70%. The experimental results were as follows: $t = 73-288$ μm, $1 = 63-78\%$ (condition I); $t = 115-238$ μm, $1 = 68.5-73\%$ (condition II). The parisons molded under the condition II showed decreased dispersion of the thickness and length of the middle layer compared with those molded under the condition II.

EXAMPLE 1

Multilayered parisons having an inner and an outer layer composed of polyethylene terephthalate (PET), and an middle layer composed of ethylene-vinyl alcohol copolymer (EVOH) were molded by using an injection molding apparatus of this invention shown in FIG. 1, and a conventional injection molding apparatus shown in FIG. 7. The molded parisons were stretch-blown to a predetermined ratio by a stretch-blow molding machine to give two kinds of three-layered containers by the apparatus shown in FIG. 1 and FIG. 7, respectively.

The three-layered containers had the interior volume of 470 cc, and the desired values of layer thickness were as follows: the outer layer 252 μm, middle layer 47 μm, and inner layer 124 μm. The conditions of injection molding the multilayered parisons by using these two apparatuses, each having injection screw size 38 $\phi$ on the PET side and 16 $\phi$ on the EVOH side are as follows: barrel temperature 270° C. on the PET side and 225°-230° C. on the EVOH side; hot runner temperature 270° C. on the PET side and 230° C. on the EVOH side; number of injection step is 2 on the PET side and 1 on the EVOH side; and injection time 9.5 second. As shown in FIG. 4, the injection timing was as follows: (1) PET was injected and the injection was stopped immediately; (2) EVOH was injected; and (3) PET was injected again and both injections were continued until the multilayered parison was molded.

Multilayered parisons were injection molded continuously by the two apparatuses shown FIG. 1 and FIG. 7. The injection molding apparatus of this invention showed no problems and could be operated without burning of EVOH after continuous operation for 120 hours, and could be continuously operated again two days after the above operation under the molding conditions mentioned above after purging with 17 shots. The conventional injection molding apparatus showed burning of EVOH after continuous operation for 60 hours, and could not be continuously operated for more than 72 hours due to the increase of EVOH burning and unstable formation of the middle layer (unstable location among the three layers).

The resultant multilayered parisons were stretch-blown by heating at 100° C. for 7 seconds and blowing for 9 seconds at an atmospheric pressure of 23 kg/cm².

Figure 6:
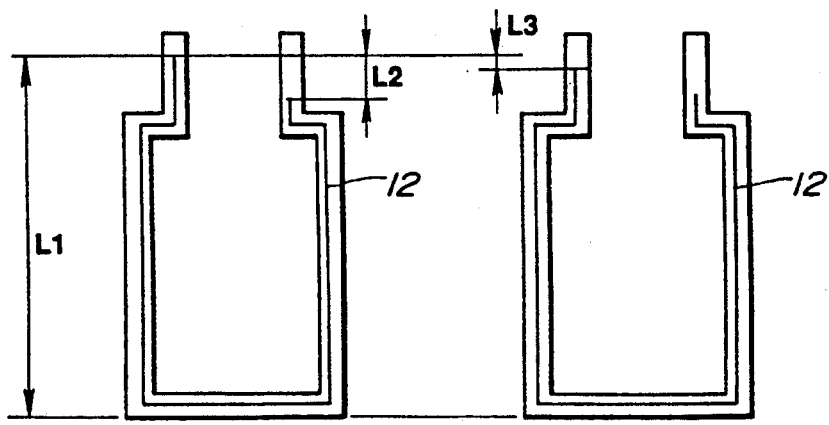
FIG. 6 is a sectional view showing parts of the middle layer where length is measured.

Then, 100 multilayered containers (Sample 1) formed by the injection molding apparatus of this invention, and 100 multilayered containers (Sample 2) formed by the conventional apparatus were prepared, and the height of the intermediate layer of these samples was measured at various parts in the circumferential direction of each container. The dispersion of the intermediate layer height (h) within a container and among 100 containers was calculated by using the following formula: h (within a container) = $L_2/L_1$; h (among 100 containers) = $L_3/L_1$ ($L_1$, $L_2$, $L_3$ shown in FIG. 6). The results are shown in Table 1.

TABLE 1

|  | Dispersion of the intermediate layer height within a container (%) | Dispersion of the intermediate layer height among 100 containers (%) |
|---|---|---|
| Sample 1 | 0.83 | 0.67 |
| Sample 2 | 11.14 | 18.61 |

The intermediate layer thickness of the body was measured for the above samples, and the dispersion of the intermediate layer thickness (t) within a container and among 100 containers was calculated by using the formula: t = (max. thickness − min. thickness)/(max. thickness), and the results are shown in Table 2.

TABLE 2

|  | Dispersion of the intermediate layer thickness (t) within a container (%) | Dispersion of the intermediate layer thickness (t) among 100 containers (%) |
|---|---|---|
| Sample 1 | 13.33 | 19.50 |
| Sample 2 | 27.83 | 38.16 |

The experimental results show that Sample 1 prepared by the injection molding machine of this invention had extremely decreased dispersion of both middle layer height and thickness compared with Sample 2 prepared by the conventional machine.

EXAMPLE 2

Then, 40 containers (renamed Sample 1) from the Sample 1, and 40 containers (renamed Sample 2) from the Sample 2 in Example 1 were used in this experiment. Thermal load −20°-40° C. (3 cycles) was applied to 20 containers from Sample 1 and 20 containers from Sample 2, and layer peeling of these samples was checked after each cycle by applying pressure 5 kgf/cm² with a push pull gauge. The experimental results are shown in Table 3 [values showing (no. of non-peeled containers)/(no. of total containers)].

TABLE 3

|  | 1 cycle | | 2 cycles | | 3 cycles | |
|---|---|---|---|---|---|---|
|  | −20° C. | 40° C. | −20° C. | 40° C. | −20° C. | 40° C. |
| Sample 1 | 20/20 | 20/20 | 20/20 | 20/20 | 20/20 | 20/20 |
| Sample 2 | 20/20 | 20/20 | 20/20 | 19/20 | 18/19 | 18/18 |

Similar thermal load tests (3 cycles 60°-20° C.) were carried out with the remaining containers, and the results are shown in Table 4.

TABLE 4

|  | 1 cycle | | 2 cycles | | 3 cycles | |
|---|---|---|---|---|---|---|
|  | 60° C. | 20° C. | 60° C. | 20° C. | 60° C. | 20° C. |
| Sample 1 | 20/20 | 20/20 | 20/20 | 20/20 | 20/20 | 20/20 |
| Sample 2 | 20/20 | 20/20 | 20/20 | 20/20 | 19/20 | 19/19 |

The results of the heat resistance tests show that peeling did not occur in Sample 1 prepared by the injection molding machine of this invention, and that peeling occurred in 3 containers prepared by the conventional injection molding machine.

EXAMPLE 3

Then, 40 containers (renamed Sample 1) from Sample 1, and 40 containers (renamed Sample 2) from Sample 2 in Example 1 were used in dropping tests. Each container was filled with 100 g of instant coffee, and repeatedly dropped in an upright state until peeling occured in the container, dropping height being increased by 10 cm for each repetition of dropping. Among 40 containers in each Sample, 20 containers were held at a temperature of 60° C. and the other 20 containers were held at −20° C. for 24 hours before dropping tests. The test results are shown in Table 5 and 6.

TABLE 5

Peeling height (Sample held at 60° C. for 24 hours)

|  | minimum peeling height | maximum peeling height | average peeling height |
|---|---|---|---|
| Sample 1 | 2.6 m | 2.9 m | 2.75 m |
| Sample 2 | 1.7 m | 2.8 m | 2.34 m |

TABLE 6

Peeling height (Samples held at −20° C. for 24 hours)

|  | minimum peeling height | maximum peeling height | average peeling height |
|---|---|---|---|
| Sample 1 | 2.7 m | 3.1 m | 2.93 m |
| Sample 2 | 1.7 m | 3.0 m | 2.41 m |

The test results show that Sample 1 prepared by the injection molding apparatus of this invention was more resistant to peeling caused by dropping than Sample 2 prepared by the conventional injection molding machine.

Sample 1 molded by the injection molding apparatus of this invention showed improved results in Example 1 and Example 2 compared with Sample 2 molded by the conventional injection molding machine, and the good results are probably due to the stably uniform layer thickness distribution of container walls. Improved dropping shock resistance of Sample 1 is probably due to the middle layer located at more than half of the total thickness of the wall.

What is claimed is:

1. Apparatus for manufacturing a container by injection molding, the apparatus comprising:
    an inner injector element having a tubular inner body including an outer surface and first and second opposite ends, the inner injector element having an inner injection nozzle at the first end of the tubular inner body and an inner inlet near the second end opposite the inner injection nozzle;
    first and second resin flow paths, the second resin flow path connecting the inner inlet and the inner injection nozzle;
    a curved groove formed in the outer surface of the second end of the tubular inner body;
    an outer injector element having a tubular outer body including first and second opposite ends, the outer injector element having an outer injection nozzle at the first end of the tubular outer body, the outer injector element having an outer inlet near the second end opposite the outer injection nozzle, the outer injector element being disposed to hold an end of the inner injector element so that a tubular space is formed defining the first resin flow path, the outer inlet communicating with the curved groove; and
    a mold having a cavity mold and a core mold adapted to be received by the cavity mold, the cavity mold defining an orifice in communication with the outer and inner injection nozzles;
    wherein the curved groove starts at one side of the inner injector element in opposing relation to the outer inlet and extends spirally along the external circumference of the inner injector element to an opposite side of the injector element to provide resin to the outer injection nozzle with a circumferentially uniform thickness;
    wherein the inner injector element further includes a first radially outwardly expanded portion which reduces the width of the first resin flow path between portions of the outer and inner injection elements, the curved groove being formed along the external surface of the first radially outwardly expanded portion of the inner injection element; and
    wherein the tubular inner body includes a second radially outwardly expanded portion adjacent to the first end thereof.

2. Apparatus according to claim 1 wherein the curved groove is defined by substantially parallel walls.

3. Apparatus according to claim 1 which includes at least first and second radially outwardly expanded portions, each of the first and second radially outwardly expanded portions having a total length at least one-half the inside diameter of the outer injector element, the total length of each radially outwardly expanded portion being at most three and one-half times the inside diameter of the outer injector element.

4. Apparatus according to claim 3, wherein the width of each first and second resin flow paths proximate to corresponding first and second radially outwardly expanded portions is at least equal to 30 percent of the width of the first resin flow path in a region longitudinally distant from the radially outwardly expanded portions, the width of the first and second resin flow paths proximate to the corresponding first and second radially outwardly expanded portions is at most equal to 80 percent of the width of the first resin flow path in the region longitudinally distant from the radially outwardly expanded portions.

5. Apparatus according to claim 3, wherein an inside radius of the curved groove is at least equal to one-half the width of the first resin flow path in a region longitudinally distant from the radially outwardly expanded portions, the inside radius of the curved groove is at most equal to twice the width of the first resin flow path in the region longitudinally distant from the radially outwardly expanded portion.

6. Apparatus according to claim 1, wherein the curved groove is configured so that the length of the curved groove is at least 80 percent of an inside diameter of the outer injector element.

7. Apparatus for manufacturing a container by injection molding as defined by claim 1 wherein the first and second radially outwardly expanded portions are tapered to prevent the lodging of resin in the first resin feed flow path.

* * * * *